April 21, 1931.  E. G. DOLAND  1,802,202
ATTACHMENT FOR SAWHORSES
Filed April 30, 1929
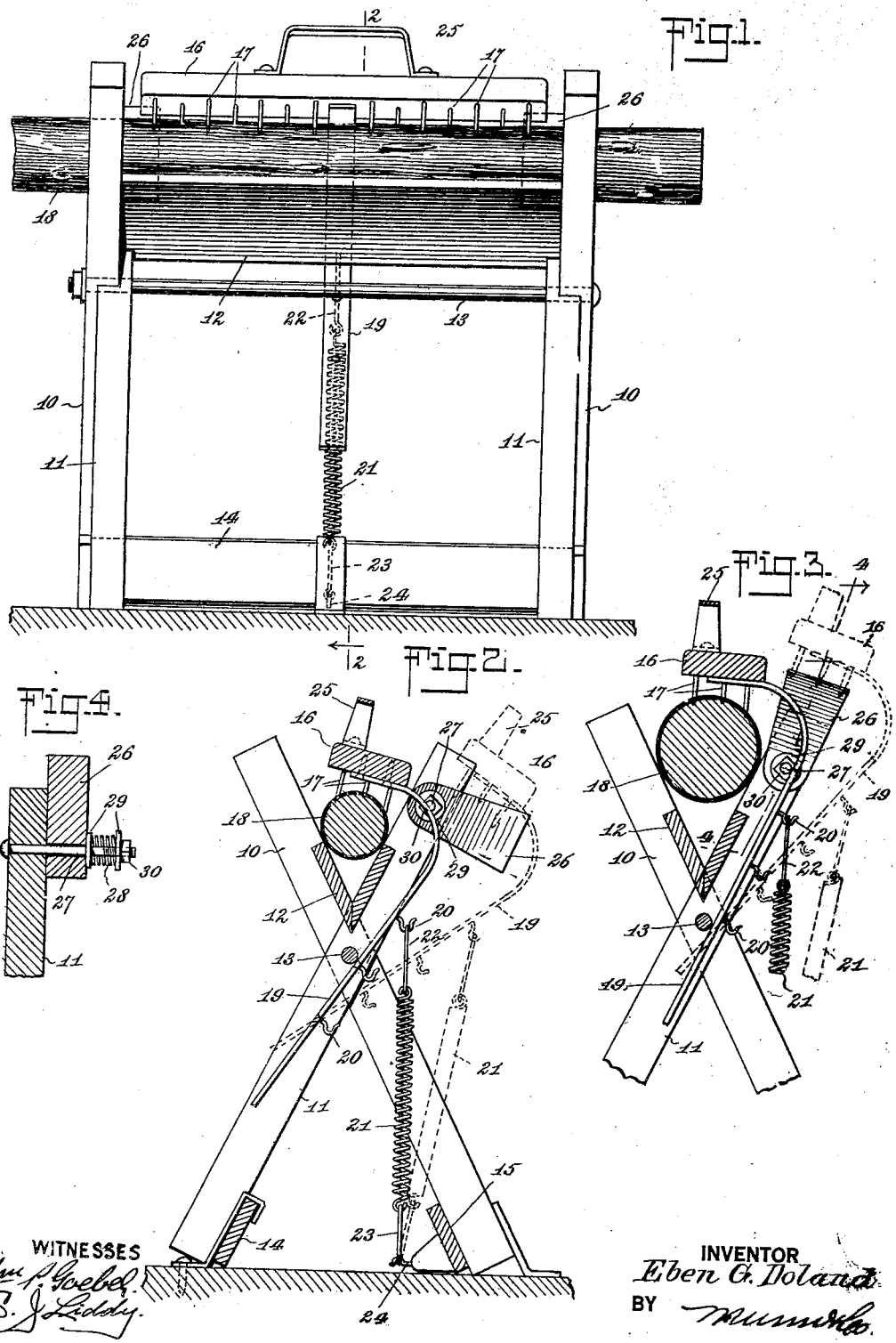

Patented Apr. 21, 1931

1,802,202

UNITED STATES PATENT OFFICE

EBEN G. DOLAND, OF STARKSBORO, VERMONT

ATTACHMENT FOR SAWHORSES

Application filed April 30, 1929. Serial No. 359,377.

This invention relates to an improvement in sawbucks or sawhorses.

The principal object of the invention is to provide a sawbuck or sawhorse with means for effectually holding the stock rigid against movement, so as not to require the sawyer to use his knee or foot for that purpose, thereby enabling the sawyer to assume a free and easy position while sawing, to the end that the sawyer may perform the task in less time and with less effort than is usually required.

The nature of the invention and its distinguishing features and advantages will appear when the following specification is read in connection with the accompanying drawing, in which—

Figure 1 is a side view of a sawhorse equipped with the improvements which are shown in use.

Fig. 2 is a vertical sectional view taken on the line 2—2 of Fig. 1.

Fig. 3 is a view similar to Fig. 2, illustrating the adaptability of the device when sawing stock of relatively large cross sectional size.

Fig. 4 is a detail sectional view taken on the line 4—4 of Fig. 3.

Referring now more particularly to the several views of the drawing, it will be apparent that there is shown a sawbuck or sawhorse of the usual construction, consisting of supporting legs 10 and 11 connected together by a trough 12, middle cross bar 13 and lower cross bars 14 and 15.

The device of the present invention is adapted to be used in conjunction with the sawhorse, and includes a bar 16 having suitable means for engaging or impaling the stock to be sawed, such as teeth or the like, and in the present instance consists of brads or nails 17 arranged in rows, there being three rows, and the middle row of brads or nails are shorter than the brads or nails of the other rows so as to better engage the concave surface of substantially cross sectionally round stock, a piece of which is designated 18. The bar 16 has rigidly connected therewith a gooseneck arm 19 having a plurality of laterally projecting hooks 20 arranged in spaced relationship. A tension spring 21 has loops or eyes 22 and 23 on the opposite ends thereof. The loop or eye 22 is engageable with either one of the hooks 20, whereas the loop or eye 23 is engageable with a hook or the like 24 on the cross bar 15. The bar 16 with its brads or nails 17 together with the arm 19 constitute a clamping dog under the influence of the tension spring 21, when in use. The bar 16 is provided with a handle 25. It will now be apparent that when a piece of wood is arranged in the horse, the dog may be brought to a position in which the brads or nails 17 will impale themselves into the wood under the influence of the spring 21, while the arm 19 which may engage the middle cross bar 13 of the horse prevents the dog from moving laterally under the pulling action of the spring 21. Thus the wood is effectually held against movement in the horse until the dog is released and moved out of engagement with the wood.

In order to support the dog in an inactive position there are provided rests or supports 26 each of which is mounted on the upper end of one of the legs 11 of the horse by a bolt 27 carried by said leg, there being a compression spring 28 arranged on the bolt between washers 29 one of which is in contact with the rest 26 and the other one of which is in contact with a nut 30 on the bolt. On reference to Fig. 2, it will be apparent that the dog is shown in dotted lines supported by the rests 26 in the inactive position. It will therefore be obvious that when the dog is not in use, it may be conveniently supported in position on the rests 26, so that the tension spring 21 will exert a pulling force thereon, thus holding the dog in place in contact with the rests 26, ready to be moved into clamping engagement with each piece of wood as it is placed in the horse to be cut or sawed. By turning the rests 26 upwardly from the positions shown in Fig. 2 to those illustrated in Fig. 3, it will be possible to support the dog in a higher position, which will permit of less motion in moving the same to its inactive position when the wood or stock runs large. Under such circumstances, the tension spring 21 may be engaged with another one of the hooks 20 in order to obtain the proper tension of the spring 21.

In practice the sawhorse may be suitably secured to the ground or floor to afford the necessary stability. It is also to be understood that if the sawhorse is to be kept in a permanent place for any length of time, the lower end of the tension spring may be connected with a suitable stake or the like driven in the ground or floor.

I claim:

The combination with a sawhorse, of a freely movable dog adapted to hold the stock to be cut or sawed while positioned on the sawhorse, tension means connected with said dog and sawhorse to maintain said dog in holding engagement with said stock, and pivotally mounted members on said sawhorse which cooperate with said tension means to support and hold said dog in different inactive positions with respect to the sawhorse.

EBEN G. DOLAND.